United States Patent

[11] 3,545,634

| [72] | Inventor | David M. Reed |
| | | Box 652, Martin, Kentucky 410011 |
| [21] | Appl. No. | 760,587 |
| [22] | Filed | Sept. 18, 1968 |
| [45] | Patented | Dec. 8, 1970 |

[54] WORK VEHICLE
2 Claims, 8 Drawing Figs.

| [52] | U.S. Cl. | 214/510, 214/767 |
| [51] | Int. Cl. | B60p 1/04 |
| [50] | Field of Search | 214/767, 131, 132, 140, 510, 82, 146(E), 774; 37/126, 126(A2) |

[56] References Cited
UNITED STATES PATENTS

| 3,007,589 | 11/1961 | Golloway | 214/82 |
| 3,038,619 | 6/1962 | Wagner | 214/774 |
| 3,170,578 | 2/1965 | Moreland | 214/82 |
| 3,226,857 | 1/1966 | Porter et al. | 214/131X |
| 3,349,931 | 10/1967 | Wagner | 214/82 |

*Primary Examiner*—Hugo O. Schulz
*Attorney*—Robert G. McMorrow

ABSTRACT: A work vehicle has two body sections articulated to one another and has a bucket assembly on one of the sections which is equipped with an unloading mechanism.

INVENTOR
DAVID M. REED
BY
Robert G. McMorrow
ATTORNEY

PATENTED DEC 8 1970
3,545,634
SHEET 2 OF 3
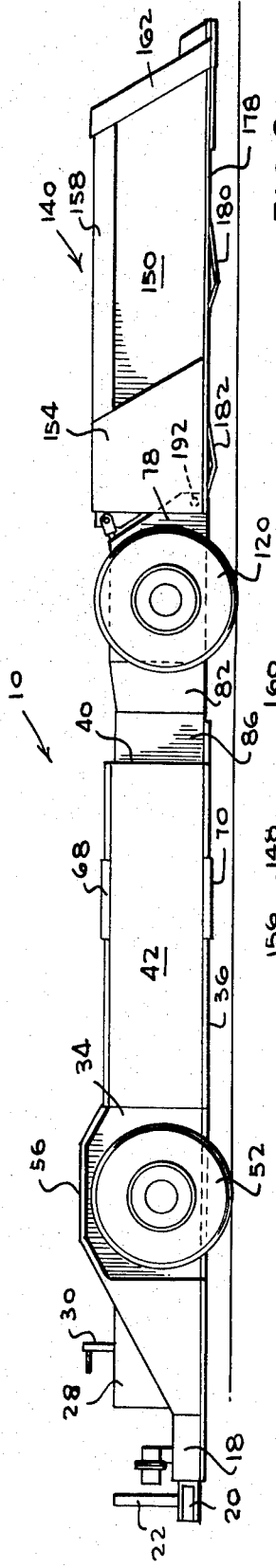
FIG. 2.
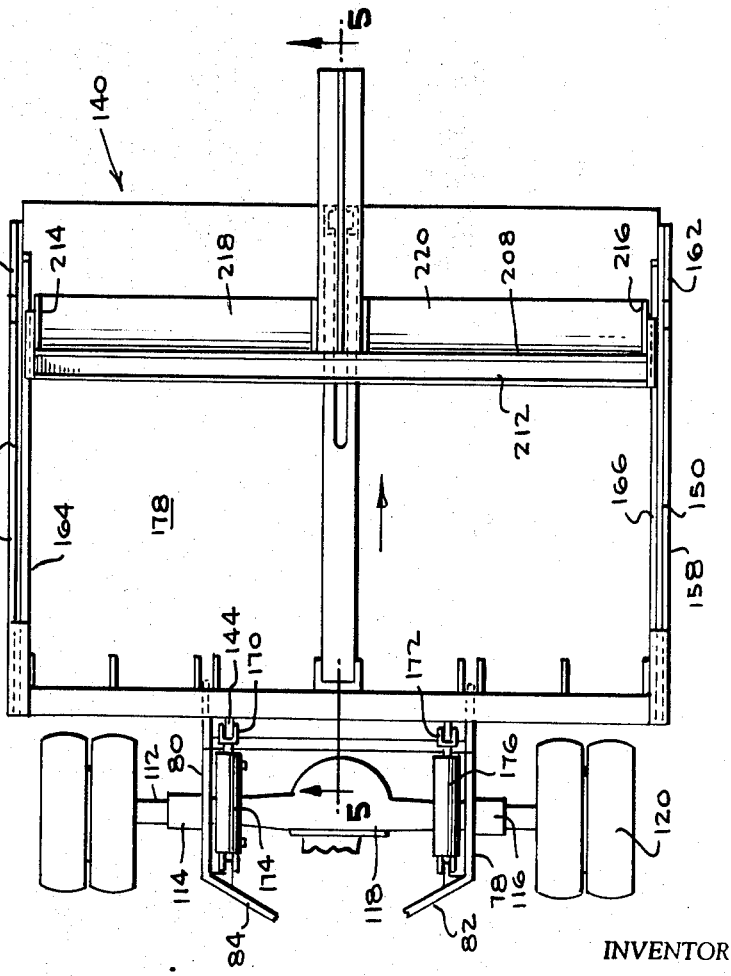
FIG. 3.
FIG. 4.
INVENTOR
DAVID M. REED
BY
Robert G. McMorrow
ATTORNEY

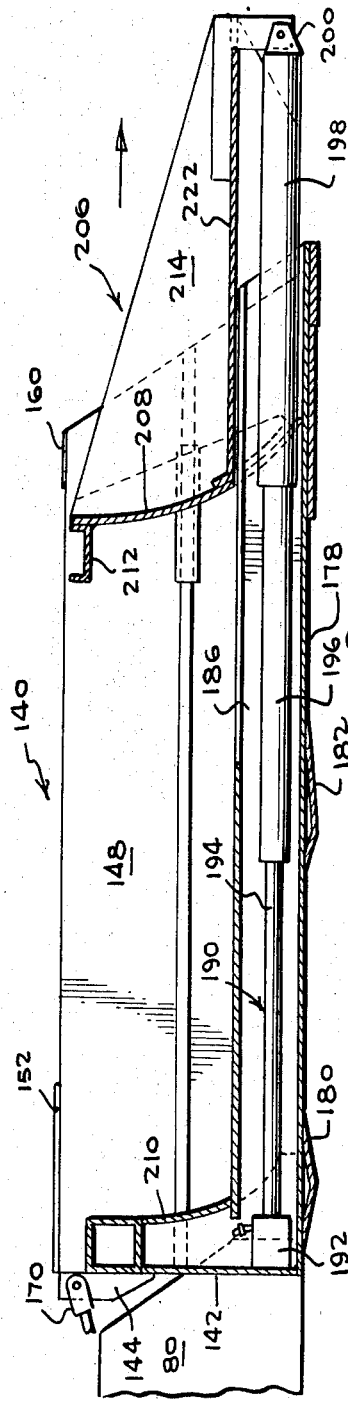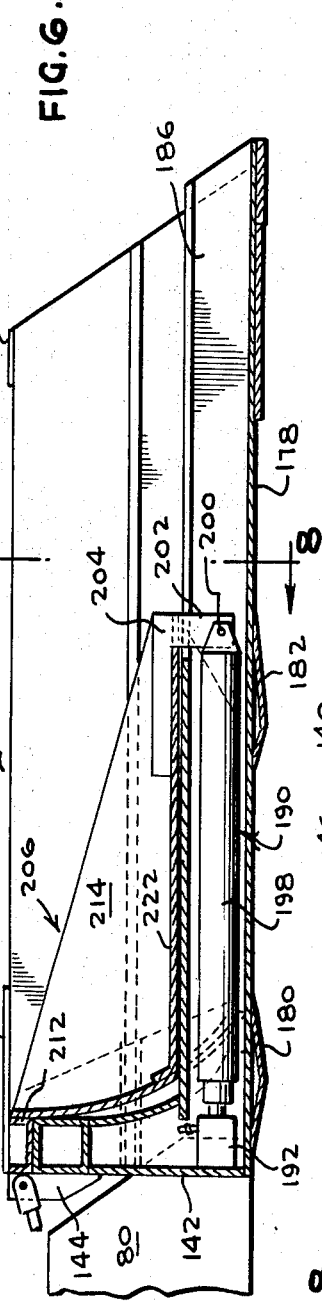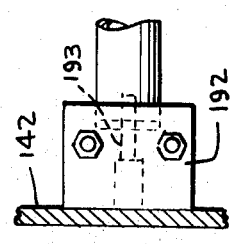

WORK VEHICLE

BACKGROUND OF THE INVENTION

1. Field of the Invention

This invention relates to work vehicles of the type employed in mining operations and the like, where there is a low silhouette requirement as to overall body height.

2. Statement of the Prior Art

This invention comprises improvements in the subject matter of prior U.S. Pat. No. 3,226,857. In that patent, a work vehicle powered by an electric motor means has a main frame with two axles, one axle being a drive axle and the other a steering axle. The axles are different in construction and in function from one another. A forward scoop or bucket is provided and is located ahead of the frame, and is not laterally pivotal independently of the entire frame.

SUMMARY OF THE INVENTION

The present invention contemplates a work vehicle of the type indicated above wherein two independent frame sections, each having a substantially identical drive axle thereon, are articulated to one another, and wherein the controlled pivoting of the sections effectively operates to steer the vehicle. By this structural expedient, each of the axle assemblies is a driving axle and is of identical construction.

It is a major objective of this invention to provide a vehicle of the character indicated in which the load bearing portion is carried on an independent body section with drive means thereon and whereby the load weight and the operating component weight are balanced more effectively. A further advantage of this construction resides in its adaptability to fabrication from a single axle design, and the elimination of a special steering mechanism for the turning axle as is often encountered in vehicles with multiple drive axles.

A further principal objective of this invention resides in the provision of a work vehicle having a scoop or bucket portion with power operated unloading means; and one in which the unloading means includes a central track assembly effectively shielding the operating components thereof from damage. An additional and related object is to provide an unloading mechanism disposed at the center base of the implement, whereby the work load distribution is maximized.

Yet another object and advantage of this construction over prior machinery of this type resides in supplying a multiple axle vehicle wherein the load supporting structure of the vehicle is mounted on a drive axle, and wherein the drive axle is also a steering axle by virtue of a hydraulically powered mechanism.

Other and further objects and advantages of the invention will become apparent to those skilled in the art from a consideration of the following specification when read in conjunction with the annexed drawing.

BRIEF DESCRIPTION OF THE DRAWING

FIG. 2 is a side elevational view;

FIG. 3 is an enlarged sectional view showing details, taking substantially on the section line 3–3 of FIG. 1, looking in the direction of the arrows;

FIG. 4 is a plan view of the forward frame section with its own loading means in extended position;

FIG. 5 is an enlarged sectional view on line 5–5 of FIG. 4, looking in the direction of the arrows;

FIG. 6 is a view similar to FIG. 5, but showing the components in retracted positions;

FIG. 7 is a detail view in elevation and on enlarged scale of a cylinder mount hereof; and FIG. 8 is a transverse cross section on line 8–8 of FIG. 6 looking in the direction of the arrows.

DESCRIPTION OF A PREFERRED EMBODIMENT

Figure 1:
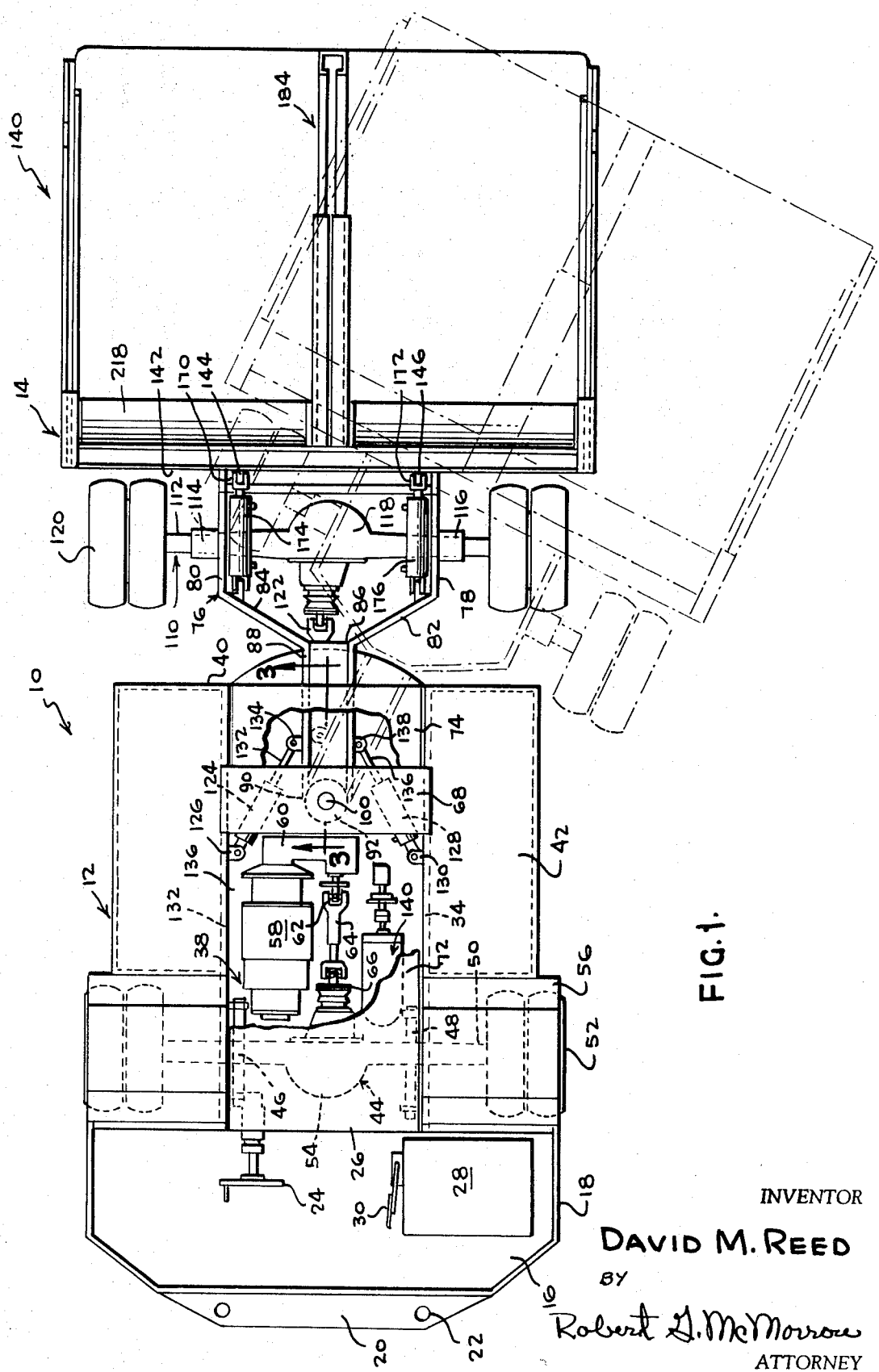
FIG. 1 is a top plan view of a vehicle constructed and assembled in accordance with the teachings of this invention showing a pivotal position of the the forward frame section in phantom lines.

The invention herein disclosed comprises a work vehicle generally identified in the drawing by reference numeral 10. The vehicle 10 is adaptable to numerous environments of utilization, but finds particular advantage in low overhead subterranean locations such as mine shafts. In that area of use, the present vehicle is quite effective in maintaining roadways in thin seam mining locations, thereby freeing regular production equipment from that function and furnishing safer, more efficient road areas. The apparatus is moreover usable as a substitute for regular production equipment in areas where that equipment is too bulky or cumbersome for effective use.

The vehicle 10 comprises two independent body sections, including a rear frame section 12 and a forward frame section 14. The rear section 12 has a substantially flat riding pallet 16 at its trailing end. The pallet includes a surrounding flange 18 and a rear extension 20 with upright tow bars 22 thereon. The steering wheel 24 is operatively mounted on the frame rear wall 26 adjacent the pallet, and a housing box 28 for control components is also suitably mounted thereon. The housing 28 has hydraulic control levers 30 thereon.

The main frame 12 has side frame member 32, 34 and a base 36. It is open between the side frame members, thereby defining a central body area 38 which is open at the leading end 40 of the rear frame section. At each of the sides of the frames, side portions 42 forming housings are provided. In these, batteries for supplying energy for operation and propulsion are provided. These batteries, and their functions and relations to the apparatus, are substantially the same as heretofore described in Pat. No. 3,226,857, and the wiring thereof not therefor is disclosed in detail in this instance.

As shown in FIG. 1, a first axle assembly 44 is mounted on the rear frame section 12, and is suitably supported in respect to spring means 46, 48 on the walls 32 and 34. The assembly includes an axle 50 with tandem ground wheels 52 at each end, and a central universal drive 54. Fenders 56 overly the wheels and form a portion of the body section.

A traction motor 58 powered by EMF supplied by the batteries in housings 42 is mounted on the base 35. Suitable speed reduction means is contained in a housing 60 and is engaged by an output linkage shaft 62 to a drive shaft 64 connected in turn to a drive 66 engaged with the universal drive 54 of the first axle. As appears in more detail below a second output shaft 67 (FIG. 3) extends from the housing 60 and is operated at the same speed as the shaft 62.

Referring to FIGS. 1, 2 and 3, it will be observed that heavy gage top and bottom plates 68 and 70 span the distance between the side walls 32 and 34, the plates being vertically alined with one another. Top cover members 72, 74 also span the open area 38 aft and forward of the top plates 68, thereby enclosing the operating components of the vehicle 10.

The plates 68 and 70 form a portion of the means for connection of the forward frame section 14 to the rear frame section 12. The frame section 14 comprises a fork assembly 76 composed of side plates 78, 80 mounted in parallel, spaced apart relation to one another, inwardly converging brace plates 82 and 84 integrally joined at their outer ends to the plates 78 and 80, respectively, and integral at their respective inner ends with connecting bars 86 and 88. The latter are closely spaced and substantially parallel to one another. At their distal ends 90 they are fixedly secured on opposed sides of the upper and lower hinge members 92, 94 best shown in FIG. 3. The hinge members are of annular form and have central openings 96, 98 therein. Enlarged bolt members 100, 102 are extended from the top and bottom plates 68 and 70, and the bolts have threaded ends which project inwardly of the hinge members 92, 94. The bolt shanks extend through the openings 96 and 98 and are of a reduced diameter relative thereto to permit turning of the hinge members about the bolts. Annular bearings 104 are disposed within the body sections of the hinge members, and retaining bolts 106, 108 are engaged on the threaded ends of the bolt shanks.

As shown in FIG. 1, a second axle assembly 110 comprises an axle 112 extended through bearing sleeves 114, 116 on the side plates 78 and 80 of the forward frame. The axle includes a central universal gear assembly 118 and tandem ground wheels 120 at each side. The universal is linked to the drive motor 58 by a linkage shaft 122 connected, at universal coupling 123, to the output shaft 67. It is to be noted that the second axle assembly 116 is substantially identical to the first axle assembly 44 thereby reducing the cost of manufacture and maintenance of the vehicle by reducing the inventory of its components.

Steering is accomplished by means of hydraulic cylinder means mounted on at least one and preferably both of the sides of the tongue. This takes the form in this embodiment of the invention of a first cylinder 124 secured pivotally in a clevis 126 to the side wall 32 and a second cylinder 128 pivotedly mounted in a clevis 130 on the wall 34. The cylinder 124 has an extendible and retractable element 132 pivoted to a clevis 134 on the brace 88 and the cylinder 126 has a like member 136 on the bar 86. The connecting hoses of the apparatus, which operatively relate the cylinders to a hydraulic pump and motor 140 mounted on the base 36 within the opening 38 has been omitted from the drawing for clarity of illustration and are conventional. It will be observed that steering is effected through extension and retraction of the members 132 and 136 causing pivoting of the fork assembly 76 of the frame 14 about the bolts 100 and 102.

The load handling means of the invention comprises a bucket assembly 140. The assembly 140 is, like the remainder of the vehicle, of low silhouette, and the details of its construction are best illustrated in FIGS. 5, 6 and 8 of the drawing. The bucket includes a vertical back wall 142 having upper connection pieces 144, 146 extending toward the main frame. The bucket further has side wall assemblies including main walls 148, 150 and outer reinforcing members 152, 154, respectively. Top braces 156, 158 with horizontal ledges, forward braces 160, 162, and inner guide tracks 164, 166 complete the sides. As indicated in FIGS. 2 and 4 the bucket is pivoted on pins 167 extended through upright braces 169 and through the leading ends of the plates 78 and 80, thereby to associate the lower corner of the bucket with the frame 14, and the bucket is also pivoted at its upper connection pieces 144, 146 to clevises 170, 172 forming portions of extendible and retractable hydraulic cylinders 174, 176 (which are pivoted also to the brace plates 82, 84 respectively) and connected to the vehicle hydraulic system and control in any suitable means (not shown). Thus, the bucket is pivotable about a transverse axis of the frame by action of the hydraulic cylinder means.

The bucket assembly 140 further includes a bottom wall 178 with lateral reinforcing trough elements 180, 182. The bucket has a centrally disposed, longitudinally extending guide track 184 extending upwardly, composed of two L-shaped structural members 186, 188 fixed to the base. Housed between and protected by the members 186, 188 is a multiphase retractable and extendible hydraulic cylinder 190 having a first end 192 secured on the bucket rear wall. In FIG. 7, the details of the end 192 are shown, and it will there be observed that an anchor pin 193 is extended therethrough. The cylinder 190 includes longitudinally extendible portions 194, 196, 198, and the distal end 200 of the portion 198 is secured to a depending leg 202 of a plate 204. A plow assembly 206 for clearing the bucket assembly includes a curved rear wall 208 abutting an interior panel 210 of the bucket at a rear wall 142 in one position and having a rear transverse channel flange 212 which extends over the panel in that position. The plow assembly also has side members 214, 216 and bases 218, 220. A central wall composed of two sides 222, 224 is secured to the plate 204.

The manner of operation of the vehicle is clear from the foregoing description of its construction. Steering is accomplished, as indicated above, by extension and retraction of the cylinders 124, 128; the tilting of the bucket is controlled and accomplished through actuation of the cylinders 174 and 176; and the clearance of the loaded bucket by extension and retraction of the cylinder means 190. In connection with the latter, it is to be observed that the actuation means and all operating components are totally shielded from harm by materials carried within the bucket assembly, and this actuation means is also centrally located thus giving maximum utility to the cylinder in performance of its function.

Having described and illustrated an embodiment of this invention in some detail, it will be understood that this description and illustration has been offered only by way of example and that the invention should be limited in scope only by the appended claims.

I claim:

1. In a vehicle for loading, hauling, and discharge of materials in areas having low overhead clearance:

a rear frame section including side portions and a base;
motor and drive means on the base;
a first axle assembly, with ground wheels thereon, operatively mounted on the rear frame section;
linkage means drivingly connecting the motor and drive means on the base with said first axle assembly;
a forward frame section, having a tongue pivotally secured to the rear frame section between the side portions thereof;
extendible and retractable hydraulic cylinder means for pivoting of the tongue and forward frame sections with respect to the rear frame section, the aforesaid means comprising a pair of cylinders each having one end pivotally engaged with the rear frame section and one end pivotally engaged with the tongue, and being operated in such manner that extension of one cylinder and retraction of the other cylinder effects said pivoting of the tongue and forward frame section;
a second axle assembly, with ground wheels thereon, operatively mounted on the forward frame section;
linkage means drivingly connecting the motor and drive means with the second axle assembly, the linkage means including a universal coupling disposed at the pivot of the forward frame and rear frame and drive shafts extending from the second axle assembly and to the motor means;
a bucket assembly on the forward frame section, the bucket assembly including hydraulic load discharge means;
hydraulic tilt means for the bucket assembly; and
the bucket assembly including a bottom wall having a longitudinally extending guide track centrally disposed therein and a plow with a curved rear wall, the load discharge means including a multiphase extendible and retractable hydraulic cylinder housed in said guide track and operable upon extension and retraction to move said curved rear wall forwardly and rearwardly across the bottom wall, and when extended to move the plow on the guide track to a discharge position.

2. The invention of claim 1, wherein:

the multiphase cylinder includes longitudinally extendible portions; and
the plow includes means slidably disposed on the guide track.